Figure 1:
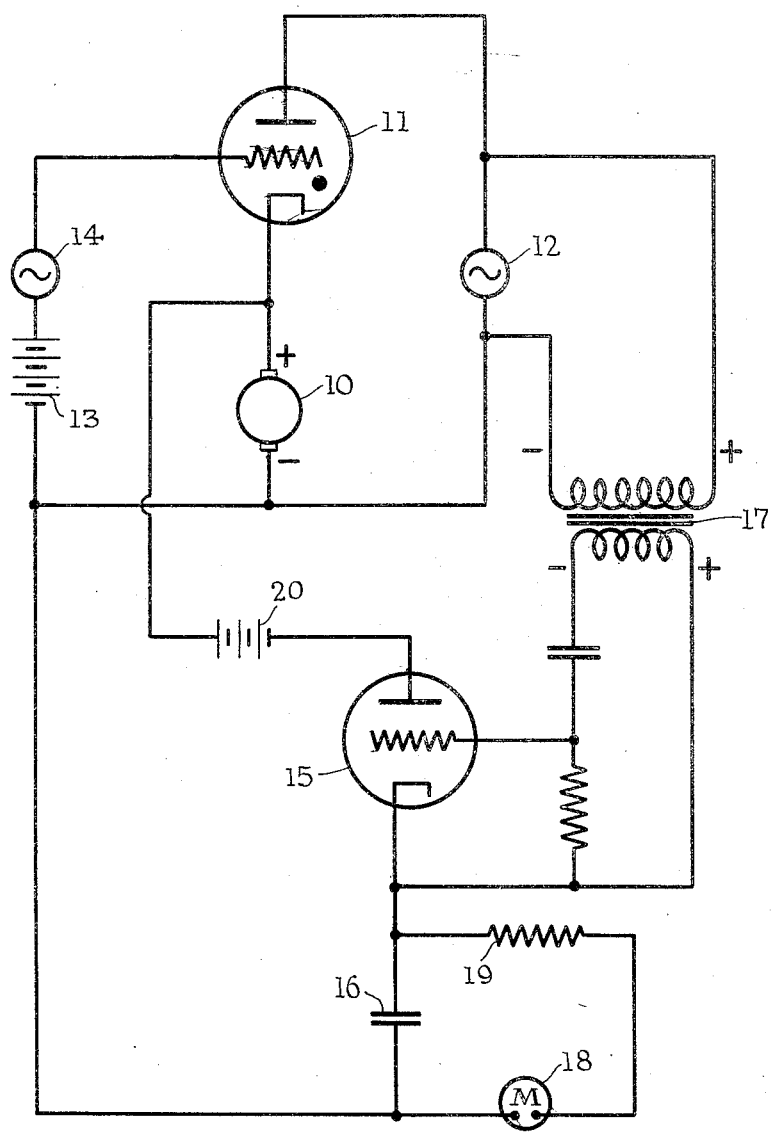

INVENTOR
Oscar E. Carlson

Patented Aug. 18, 1953

2,649,572

UNITED STATES PATENT OFFICE 2,649,572

COUNTERELECTROMOTIVE FORCE DERIVATION CIRCUIT

Oscar E. Carlson, Paterson, N. J.

Application April 10, 1953, Serial No. 348,081

10 Claims. (Cl. 324—70)

This invention relates to circuit arrangements for use in connection with electronic speed control systems for direct current motors running from alternating current sources. More particularly, this invention relates to circuits for use with speed control systems of the so-called half wave type, that is, systems in which a direct current motor is connected to an alternating current source through a half wave rectifier device. It is known practice to use thyratron type tubes for the rectifiers in systems of this type.

This application is a continuation-in-part of my co-pending application Serial No. 291,725, filed June 4, 1952, and now abandoned, which shows an embodiment of my invention as applied to a uni-directional control system. The present application adds to the disclosure of the parent case by showing the identical invention applied to a bi-directional control system. In order to provide a bi-directional control system, it is only necessary to connect two of the circuits, such as shown in the above mentioned application, together in back to back relationship.

It is also known that a direct current motor supplied with current by a half wave rectifier from an alternating current source, exhibits a voltage across its armature which is an integrated voltage comprising the applied voltage from the rectifier source and the back or counter E. M. F. of the motor. In many cases, it is desirable to have a voltage for use as a reference or as an indication of the speed of the motor which is directly proportional to the back E. M. F. of the motor. In a half wave rectifier system, the motor is supplied with current only during half of each cycle of the alternating current source. During the negative portion of the applied cycle, the rectifier, of course, does not conduct and the motor in effect coasts through this portion of the cycle. During this time, therefore, since no voltage is applied to the armature of the motor, it is in effect acting as a direct current generator with no load.

It is an object of this invention to provide a circuit arrangement which will derive a voltage which is directly proportional to the back E. M. F. of a motor operating under these conditions.

It is a further object of this invention to provide a circuit which may be connected in shunt with the armature of the motor, but which will conduct current only during the negative portions of the applied alternating current voltage, i. e., when no voltage is being applied to the armature of the motor.

It is also an object of this invention to synchronize the gating of the circuit in shunt with the motor armature with the alternations of the alternating current source.

It is also an object of this invention to provide a circuit which will accomplish the above objects and which may be readily added to a standard half wave motor control circuit with a minimum of complexity and expense.

Figure 2:
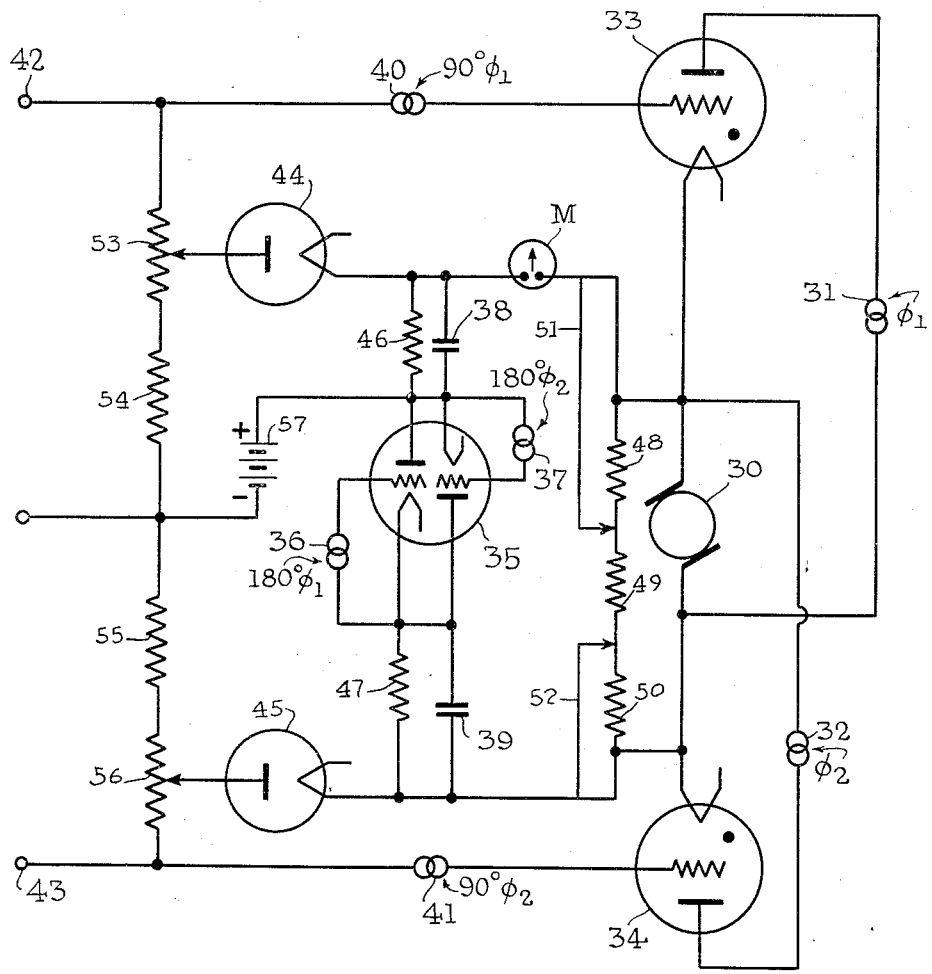

Other objects will be apparent from the following description read in conjunction with the attached sheets of drawing in which:

Figure 1 shows a uni-directional control system embodying the present invention, and Figure 2 shows the same invention as applied to a bi-directional control system.

Referring now to the drawing for a complete understanding of this invention, the direct current motor 10 which has a separately excited field winding, not shown, is connected in the plate cathode circuit of a thyratron tube 11 and both are connected in series with a source of alternating current 12. The circuits for controlling the flow of current in the thyratron 11 may take any one of a number of known forms. Since this forms no part of the present invention, the grid control circuit is indicated only schematically as a direct current source 13 superimposed upon an alternating current source 14.

A second tube 15, shown here as a triode, has its plate and cathode connected to opposite sides of the armature of the motor 10 and a condenser 16 is connected in series with the cathode lead.

By impressing on the grid of the tube 15 a voltage sufficient to bias the tube to cut off during periods when the alternating current source 12 is applying a positive voltage to the plate of thyratron 11, and applying a positive voltage to the grid of the tube 15 during periods when the alternating current source 12 is supplying a negative voltage to the plate of the thyratron 11, the tube 15 may be made to conduct current only during that portion of the applied alternating current cycle when no voltage is applied to the armature of the motor. In order to synchronize, therefore, the gating of the tube 15 with the frequency of the alternating current source 12, a transformer 17 is provided. The secondary of transformer 17 is connected to the grid of tube 15 while the primary is connected directly across the alternating current source 12. From the foregoing it will be apparent that at times when the alternating current source 12 is supplying a positive voltage to the plate of the thyratron 11, the instantaneous polarities indicated on the drawing adjacent the transformer will be as shown. The relative polarities, of course, will be the same at all times. Under these conditions, therefore, current will flow through condenser 16 whenever tube 15 is conducting. The voltage which follows the current flow will rapidly approach a steady value and will be directly proportional to the back E. M. F. of the motor. By properly proportioning the values of condenser 16 and a resistor 19, it will be possible to maintain the voltage at all times when the motor is running.

One use which may be made of the voltage which appears across condenser 16 in this circuit is use as a speed indicator. A voltmeter 18 is connected in series with the resistor 19 across the condenser 16. With the resistor-condenser combination proportioned as above, it is possible to achieve a stable voltage across the condenser 16 and this voltage will be indicated by the meter 18. The latter, of course, may be easily calibrated to indicate directly the speed of the motor 10.

The additional source of direct current potential in the plate circuit of tube 15, indicated by battery 20, is optional and for the purpose of providing a so-called suppressed zero scale for the meter 18. When used, zero voltage on the meter may represent an actual speed of rotation of the motor 10. Obviously the direct current source 20 would have to have its negative side connected to the anode of the tube 15 so as to oppose normal current flow in the tube until the back E. M. F. of the motor rises to a predetermined level.

It will be obvious to those skilled in the art that while the tube 15 is shown herein as a vacuum triode, it could be any grid controlled electronic valve and could also be a so-called hard triode or transistor. It will also be apparent that there are many known equivalents for the thyratron 11 which would a workable, if somewhat more limited, control.

While the voltage developed in the cathode circuit of the tube 15 directly proportional to the back E. M. F. of the motor 10 is used to furnish an indication of speed in the foregoing description and drawing, it will be further apparent to those skilled in the art that other uses could be made of this voltage. It could, for example, be used as a reference voltage to control the firing time of the thyratron 11.

Referring now to Figure 2 of the attached sheets of drawing, a bi-directional control system is shown. The armature 30 of the direct current motor is connected in series with a pair of sources of alternating current voltage 31 and 32 to form, together with thyratrons 33 and 34, a pair of series circuits which will pass current through the armature in opposite directions. By controlling the grid voltages of the two thyratrons one or the other may be caused to conduct to pass current through the armature in either desired direction for the desired direction of rotation.

It will be understood that the alternating current sources 31 and 32, which are shown diagrammatically in the drawing, will in general be a pair of secondary windings of a transformer, the primary winding of which is connected to a single phase alternating current source. For convenience, and to simplify the drawing, they have been shown diagrammatically as have the other sources of current necessary to operate this circuit. In this way, it is also easier to indicate the relative phase relations between the various sources.

In order to apply the invention to a bi-directional control system such as shown, it is necessary to use a pair of triode tubes such as the tube 15 shown in Figure 1. Obviously the two triodes may be contained within the same envelope as shown at 35 in Figure 2. They are inversely connected across the armature of the motor in order that one may be made to respond to the back E. M. F. of the motor for one direction of rotation and the other for the opposite direction of rotation. It will be obvious that when one is conducting, the other is cut off due to the different polarity of back E. M. F. for different directions of rotation of the motor.

The two sources of alternating current 36 and 37, shown in the grid circuit of tube 35, must bear the same phase relation to the sources 31 and 32 as does the grid voltage of tube 15 to the plate voltage of tube 11 shown in Figure 1. These relations have been schematically indicated on the drawing. Thus, source 36 must be 180° out of phase with source 31 and source 37 must be 180° out of phase with source 32. This will insure that the two triode sections will conduct current only when voltage is not being applied to the armature of the motor from the controlling thyratron.

It is possible in this circuit to use a single meter for indicating the back E. M. F. voltage, providing the meter is of the type having a zero center scale, because it will read in different directions for the different directions of rotation of the motor armature. Such a meter is indicated at "M" in Figure 2. A reactive component the equivalent of condenser 16 in Figure 1 must, of course, be provided and in this case is shown as condensers 38 and 39 which are connected in series between the triodes and the motor armature. Resistors 46 and 47 function together with condensers 38 and 39 to provide a filtering action to maintain a fairly constant value of voltage appearing across these circuit elements. These elements have the identical function to that described for condenser 16 and resistor 19 of Figure 1. Resistors 48, 49, and 50 connected across the armature of the motor, together with their adjustable members 51 and 52, serve merely as a balancing arrangement.

The sources of voltage 40 and 41 shown in the grid circuits of the thyratrons correspond to source 14 shown in Figure 1 and bear the indicated phase relationship with the plate voltage of the thyratrons. Terminals 42 and 43 provide for connection with a direct current control voltage which will determine the direction of rotation of the motor by permitting conduction in one thyratron and preventing conduction in the other. Rapid reversal of the direction of rotation by rapid reversal of the polarity of the voltage applied to these terminals may readily be accomplished without overloading the circuit components through use of the pair of diodes 44 and 45, and their associated resistors 53, 54, 55, and 56. The battery 57 serves merely as a hold-off bias for the thyratrons 33 and 34. Use of the diodes 44 and 45 and their associated circuits, however, forms no part of the present invention and is adequately described and claimed in my copending application Serial No. 337,999, filed February 20, 1953, for Bi-Directional Electronic Motor Speed Control.

The following claims are directed to the novelty of the invention described herein, but variations within the scope of the claims will be apparent to those skilled in the art.

I claim:

1. In combination with a running speed motor control system, of the type in which a direct current motor is connected to an alternating current source through a half wave rectifier, a circuit arrangement for deriving a voltage directly proportional to the back E. M. F. of the motor comprising: an electronic valve having an anode, cathode and grid; means connecting the anode and cathode of said valve to opposite sides of the armature of said motor, the anode being connected to the positive side of the armature; a smoothing filter circuit connected in series between said valve and said armature; means connected in the grid circuit of said valve for biasing said valve to cut off during periods when current is being supplied to the armature of said motor from said alternating current source and for initiating current conduction in said valve during that portion of the cycle of the alternating current source when current is not being supplied to said motor; and means for connecting said system and circuit arrangement to a source of alternating current; whereby a voltage is maintained across said smoothing filter circuit which is directly proportional to the back E. M. F. of said motor.

2. A circuit arrangement as defined by claim 1 in which a transformer having its primary winding connected across the alternating current source and its secondary winding connected between the grid and cathode of said valve, is used to initiate and stop current conduction through the valve in the manner set forth in claim 1.

3. In combination with a running speed motor control system, of the type in which a direct current motor is connected to an alternating current source through a half wave rectifier, means for deriving a voltage directly proportional to the back E. M. F. of the motor comprising: an electronic valve having an anode, cathode, and grid; means including a resistive load connecting the anode and cathode of said valve to opposite sides of the armature of said motor, the anode being connected to the positive side of the armature; a transformer having at least a primary and secondary winding; means connecting the primary winding of said transformer to the alternating current source; means connecting the secondary winding of said transformer to the cathode and grid of said electronic valve so phased that whenever the rectifier is conducting current, the grid of the valve is negative; a condenser connected across said resistive load; a voltmeter connected in series with said resistive load; and means for connecting said circuit and voltage deriving means to a source of alternating current; whereby said meter will continuously indicate a voltage directly proportional to the back E. M. F. of the motor.

4. In combination with a direct current motor connected to a source of alternating current through a half wave rectifier, means for indicating the speed of the motor comprising: an electronic valve having an anode, cathode, and grid; means connecting the anode and cathode of said valve to opposite sides of the armature of said motor, the anode being connected to the positive side of the armature; a condenser connected in series with said cathode and said motor armature; a transformer; means connecting the primary winding of said transformer across the alternating current source; means connecting the secondary winding of the transformer between the grid and cathode of said valve in such phase relation that the voltage due to said transformer which appears on said grid is 180° out of phase with the voltage on that side of the rectifier supplying current to the motor which is positive during current flow therethrough; and speed calibrated indicating means connected across said condenser to continuously indicate the speed of rotation of said motor.

5. An electronic motor control circuit comprising in combination: a source of alternating current; a direct current motor; a thyratron rectifier; means connecting said motor to said source through said thyratron rectifier; means connected in the grid circuit of said thyratron rectifier for controlling the firing time thereof; a triode valve; means connecting the anode and cathode of said triode to opposite sides of said motor armature, the anode being connected to the positive side of the armature; a transformer; means connecting the primary winding of said transformer across said alternating current source; means connecting the secondary winding of said transformer between the grid and cathode of said triode in such phase relation that the triode grid voltage is 180° out of phase with the plate voltage of said thyratron; a condenser connected between the cathode of said triode and the armature of said motor; and means including a resistive circuit element connected to said condenser of such value that the voltage which appears across said condenser during half of each cycle of the alternating current source is maintained substantially constant through the succeeding half cycle.

6. A circuit arrangement as defined by claim 1 and including a source of direct current connected between the anode of said valve and said motor with a polarity opposing that of the motor.

7. Speed indicating means as defined by claim 4 and including a source of direct current connected in series between the anode of said valve and the positive side of the armature of said motor, the negative side of said source being connected to the anode of said valve.

8. In combination with a running speed motor control system of the type in which a direct current motor is connectable to an alternating current source selectively through one of a pair of oppositely connected thyratrons so that one controls the motor for rotation in one direction and the other for the other direction of rotation, a circuit arrangement for deriving a voltage directly proportional to the back E. M. F. of the motor comprising: a pair of electronic valves each having an anode, cathode and grid; means connecting the anode and cathode of one valve to opposite sides of the motor armature; means connecting the anode and cathode of the other valve to the cathode and anode, respectively, of the first valve; at least one smoothing filter circuit connected in series between said valves and said armature; means connected in the grid circuit of one of said valves for biasing one of said valves to cut off during periods when current is being supplied to the motor armature from one of said thyratrons; means connected in the grid circuit of the other of said valves for biasing the valve to cut off when current is being supplied to the motor armature from the other of said thyratrons; means connected in the grid circuit of one of said valves for initiating current conduction in one of said valves when the motor is connected to the alternating current source through one of said thyratrons and current is not being supplied to the motor armature from said thyratron; and means connected in the grid circuit of the other of said valves for initiating current conduction in said valve when the motor is connected to the alternating current source through the other of said thyratrons and only when current is not being supplied to the armature of the motor from said thyratron; whereby a voltage is maintained across said smoothing filter circuit which is directly proportional to the back E. M. F. of the motor regardless of the direction of rotation thereof.

9. In combination with a running speed motor control system of the type in which a direct current motor is connectable to an alternating current source selectively through one of a pair of oppositely connected thyratrons so that one controls the motor for rotation in one direction and the other for the other direction of rotation, a circuit arrangement for deriving a voltage directly proportional to the back E. M. F. of the motor comprising: a pair of electronic valves each having an anode, cathode and grid; means connected in the grid circuit of one of said valves for biasing said valve to cut off when the motor is connected to the alternating current source through one of said thyratrons and current is being supplied to the armature of the motor through said thyratron, and for initiating current flow in said valve only when current is not being supplied to the armature of the motor from said thyratron; means connected in the grid circuit of the other of said valves for biasing said valve to cut off when the motor is connected to the alternating current source through the other of said thyratrons and current is being supplied to the armature of the motor from said thyratron, and for initiating current conduction in said valve only when current is not being supplied to the armature of said motor from said thyratron; means including a smoothing filter circuit connected in series between the anode and cathode of one of said valves and the armature of said motor; and means including a second smoothing filter circuit connected in series between the anode and cathode of the other of said valves and the armature of said motor; whereby a voltage directly proportional to the back E. M. F. of the motor is maintained across one of said smoothing filter circuits regardless of the direction of rotation of the motor.

10. A circuit arrangement as defined by claim 9 in which speed calibrated indicating means are connected in circuit with the smoothing filter circuits to continuously indicate the speed of rotation of the motor.

OSCAR E. CARLSON.

References Cited in the file of this patent

UNITED STATES PATENTS

| Number | Name | Date |
| --- | --- | --- |
| 1,944,756 | Quarles | Jan. 23, 1934 |
| 2,573,849 | Knauth | Nov. 6, 1951 |